United States Patent [19]
Casabona et al.

[11] Patent Number: 5,822,429
[45] Date of Patent: Oct. 13, 1998

[54] SYSTEM FOR PREVENTING GLOBAL POSITIONING SATELLITE SIGNAL RECEPTION TO UNAUTHORIZED PERSONNEL

[75] Inventors: Mario M. Casabona, Cedar Grove; Murray W. Rosen, Parsippany, both of N.J.

[73] Assignee: Electro-Radiation Incorporated, Fairfield, N.J.

[21] Appl. No.: 713,891

[22] Filed: Sep. 17, 1996

[51] Int. Cl.⁶ ........................................................ H04L 9/00
[52] U.S. Cl. .................................. 380/9; 380/49; 342/357
[58] Field of Search .......................... 380/9, 49; 342/357; 455/1

[56] References Cited

U.S. PATENT DOCUMENTS

| | | | |
|---|---|---|---|
| 3,421,691 | 1/1969 | Brown | 236/9 R |
| 3,883,872 | 5/1975 | Fletcher et al. | 342/363 |
| 4,283,795 | 8/1981 | Steinberger | 342/361 |
| 4,972,431 | 11/1990 | Keegan | 380/9 |
| 5,298,908 | 3/1994 | Piele | 342/363 |
| 5,535,278 | 7/1996 | Cahn et al. | 380/49 |
| 5,541,606 | 7/1996 | Lennen | 342/357 |
| 5,610,984 | 3/1997 | Lennen | 380/49 |
| 5,621,416 | 4/1997 | Lennen | 342/357 |
| 5,663,733 | 9/1997 | Lennen | 342/357 |

OTHER PUBLICATIONS

Proceedings of the National Technical Meeting; Technology and Operations: Partnership for Success in Navigation, Jan. 22–24, 1996, Santa Monica, CA.
New Product Announcement—GPS Interference Suppression Unit, Electro–Radiation Incorporated, 39 Plymouth Street, Fairfield, Fairfield, NJ 07004, Donald W. Hiorth, V.P. Busines Development, Sep. 7, 1995.

*Primary Examiner*—Salvatore Cangialosi
*Attorney, Agent, or Firm*—Jacobson, Price, Holman & Stern, PLLC

[57] ABSTRACT

A selective or tailored system for denying global positioning satellite (GPS) signal reception to unauthorized GPS receivers yet enabling authorized receivers to maintain access to the GPS system. The invention includes two basic units, the first being a tailored jamming unit which radiates an encoded denial or jamming waveform and the second being one or more receiver units including an interference or jamming signal suppression system which allows GPS user equipments to decode and suppress the jamming signal and receive the GPS satellite signal in the denial environment. The receiver unit decodes the encoded jamming signals. The jamming or denial signals, in its simplest form, employs a bi-polarization keying (BPK) defined as synchronously switching and radiating between two (or more) polarization states (or radiators) at a near 100-percent denial duty-cycle. The radiated signal's polarization, effective radiated power (ERP) level, noise bandwidth and density, and keying modulation (or switching rate) of the radiators are selected to provide sufficient diversity of the interference signal in victim GPS system to prevent normal C/A and/or P(Y) code receiver operation. The encoded switching modulation waveform to control switching between the denial polarization states uses a pseudo-noise encryption technique which allows asynchronous reception, decoding and synchronization for authorized users possessing essential codes, time information, and secure matched synchronization techniques implemented in an adaptive polarization feed network prior to inputting to the GPS receiver. The transmit system or network can deny GPS equipment operation over an area controlled by the effective radiated power radiation pattern of the transmit unit. The receive system or network can achieve synchronized polarization mismatch against the denial or jamming sources and also achieve suppression against other forms of interference sources.

16 Claims, 12 Drawing Sheets

Mismatch Loss Relative to Denial Tilt Angle Setting

SYSTEM FOR PREVENTING GLOBAL POSITIONING SATELLITE SIGNAL RECEPTION TO UNAUTHORIZED PERSONNEL

BACKGROUND OF THE INVENTION

1. Field of the Invention

The present invention relates to a denial system for global positioning satellite systems (GPS) which concurrently denies GPS availability to unauthorized users and allows cooperating or friendly user receivers to receive the GPS signals. More specifically, the present invention relates to the covert transmission and reception of at least two distinct GPS interference jamming signals, such as two diversely polarized GPS interference jamming waveforms, that are switched in accordance with an encrypted sequence. Only those authorized receivers having access to the encryption scheme are able to synchronously decode and suppress the jamming signals using adaptive polarization mismatching of the antenna feed signal received by the authorized GPS user equipment. The present invention suppresses the interference jamming by significantly reducing the jammer-to-signal (J/S) ratio of the encoded interference jamming signal seen by the equipped GPS receiver and corrects for insertion phase modulation on the GPS carrier.

2. Description of Related Art

The global positioning satellite system (GPS) (also called NAVSTAR) is a satellite navigation aiding system which transmits digitally coded data used to determine 2- and 3-dimensional position fixes at a receiving antenna. Its purpose is to provide users with high accuracy position, velocity and universal time throughout the world at low cost. For this reason, control of GPS operability in an interference or jamming environment is valuable for both military and civilian applications.

GPS is a major technical factor in tactical and strategic military planning. GPS precision navigation is valuable to the military for information in a combat environment, enhancing the coordination of forces. GPS precision attack capability is a part of modern weapon systems, as well as the launch platforms for these weapons, to enable precision delivery. However, the availability of GPS hardware from civilian sources and the ready access to GPS technology and signals allows an unsophisticated adversary to use precision navigation, and precision attack weapons and philosophies against friendly forces and installations. It is thus desirable to protect one's own GPS capabilities, and at the same time prevent an adversary from being able to use GPS.

The key to achieving precise GPS navigational performance is the processing of a very weak GPS spread spectrum signal which carries coarse acquisition (C/A) and precision (P(Y)) digitally coded and encrypted data, typically –120 dBm to –136 dBm (isotropic). The GPS signal spectrum uses two L-band frequencies, L1 at 1575.42 MHz and L2 at 1227.60 MHz, with bandwidths of either 2.05 MHz for C/A code or 20.46 MHz for P(Y) code, and employs right hand circular polarization (RHCP) for both L1 and L2 to simplify user dependence on receive antenna orientation. The C/A and P(Y) codes are on L1, the P(Y) code is on L2.

Theoretical processing gains for C/A and P(Y) codes are 43 dB and 53 dB, respectively. GPS has a high inherent antijam (AJ) capability, however the low receive signal level makes GPS inherently vulnerable to low power interference and jamming. It is relatively easy for a local inband source to overwhelm the GPS signal, preventing successful processing of the digital data. As a result the GPS system has several susceptibilities and vulnerabilities to interference or jamming which can be exploited to achieve local control of the GPS environment, and prevent operability. For the military, it is important to establish GPS denial against an adversary and ensure availability to cooperating GPS assets in all environments.

GPS receivers exhibit different levels of vulnerability to interference and jamming emitter waveform types, including: broadband Gaussian noise, continuous wave (CW), swept CW, pulsed CW, amplitude modulated (AM) CW, phase shift keying (PSK) pseudo noise, narrowband and wideband frequency modulated signals, etc. Broadband Gaussian noise represents the most serious interference type in the group because of the difficulty of spectral/temporal filtering of broadband noise without concurrent GPS quieting, and the inherent cost, complexity and impact on GPS of spatial filtering techniques, i.e. null steering. Broadband Gaussian noise therefore represents one of the best methods for jamming, i.e. denying GPS operability.

A system has been developed for suppressing interference and/or denial jamming signals in the GPS L1 and L2 frequency bands, described in copending U.S. patent application Ser. No. 08/608,493, filed Feb. 28, 1996, entitled Interference Cancellation System for Global Positioning Satellite Receivers, inventors Casabona et al., now U.S. Pat. No. 5,712,641 and assigned to the same assignee as the present invention (hereinafter "the Casabona et al. application"). Such interference/jamming suppression system utilizes polarization nulling to effect inband interference suppression. However, such interference/jamming prevention systems may find themselves in the possession of enemy forces who then may be able to suppress jamming signal waveforms transmitted by friendly forces. Such interference/jamming signal suppression system is not intended to be selective to only authorized or friendly forces.

Thus, a need has arisen to concurrently provide a denial jamming transmission system and a coordinated interference cancelling or suppression receiver system for GPS systems that can control local GPS environments to provide selective availability to authorized users, so that the GPS signal can be received, while preventing unauthorized users from effectively suppressing the jamming signal, thus denying GPS operation to such unauthorized users.

SUMMARY OF THE INVENTION

The present invention provides for a jamming system that includes a transmit antenna system capable of propagating two jamming signal waveforms, preferably two polarization radiation patterns, or polarization states, over the same angular coverage with sufficiently dissimilar polarization properties (in tilt angle or axial ratio). The radiation properties of the transmit antenna may use either a multi-feed network or separate radiators to accomplish the preferred radiated polarization diversity. The drive signal to the transmit antenna system utilizes an exciter or oscillator source to produce jamming waveforms in the GPS bands. The jamming waveforms provided by the exciter include wideband noise suitable for GPS jamming. A modulated jamming transmitter or power amplifier arrangement connects the exciter output to the transmit antenna feed input to allow rapid commutation or switching between the polarization states of the transmit antenna. This rapid switching results in multiplexed transmitted polarization states. The multiplex rate may be empirically selected to fall between the GPS message rate and the GPS C/A chip rate. Control of the switching waveform between antenna states is determined by a coding algorithm capable of encryption using a range of modulations from simple switching to complex pseudo-noise code sequences determined to limit access to receivers capable of synchronized state prediction. The resulting modulated jamming signal is radiated over a controlled pattern and at an effective radiated power level so as to interfere with and deny GPS availability to unauthorized receivers in a local area.

The present invention further provides for a receiver unit or system that is complementary to the jamming system and is capable of demodulating the denial/jamming interference signal and synchronously suppressing this signal to the GPS user equipment. The jamming suppression takes place by providing the high quality orthogonal polarization receive antenna system as described in the commonly-assigned Casabona et al application, incorporated by reference herein, which system decomposes the received L-band environment into apparent orthogonal polarization signals representative of the GPS signal and the inband denial jamming or interference source. The orthogonal components of the received environment are filtered, amplified and transmitted from the receive antenna system to the adaptive nulling system using separate channels as is described in the Casabona et al. application. A sample of the interference signal is detected and processed to identify the denial jamming signal switching, or keying, sequence by detection of the high modulation index time-multiplex signal in the denial switching range. The modulation envelope of this signal is used by receiver decode circuitry to asynchronously adapt to the variable denial data keying rate. The receiver unit synchronizes its bit clock rate to decode the denial sequence using a user entered encryption key to produce a predictive synchronized switching, or demodulation, signal. The synchronized switching signal is used to gate the interference nulling Circuitry to determine the null states for each of the transmitted polarization states. That is, synchronous sampling of the denial or jamming signal in the GPS channel is detected and processed to produce two sets of control signals that are applied in tandem to the adaptive antenna feed circuits at the predictive switching rate to control the effective tilt angle and ellipticity (or axial ratio) of the antenna system. The effective polarization property of the antenna system is controlled so as to tandemly cross-polarize or mismatch the antenna to the two states of the denial source and thus null or suppress the denial signal in the channel containing the GPS signals. The detection and control loops are optimized to identify and acquire the two-state tailored denial signal and rapidly modulate the tilt and ellipticity properties of the adaptive system to an effective null. An extra insertion phase modulation is synchronously applied to the signal during one-state of the denial signal to minimize unintentional modulation on the GPS signal. Under a no denial jamming condition, i.e. when the jamming signal is not encoded into two jamming signals of different polarizations, the receive unit configures the effective polarization property of the antenna system as a one-state system to the preferred right hand circular polarization for optimum receipt of the GPS signal.

It is thus a principal object of the present invention to provide a tailored denial or jamming system to prevent operation of GPS systems to unauthorized users. Two distinct jamming signal waveforms are transmitted, preferably by encoding the jamming signal waveform to switch between different polarization states. The authorized receiver units utilize a coordinated interference cancelling technique and are synchronized with tailored jamming encoded waveforms to thus realize a high level of suppression or immunity from inband denial jamming interference in GPS L1 and/or L2 frequency bands.

It is a further principal object of the present invention to provide a tailored jamming unit which uses a wideband noise waveform spectrum (among other possible waveforms) of sufficient bandwidth and effective radiated power (ERP) to disrupt GPS operations in an area local to the jammer unit.

It is a further principal object of the present invention to provide a tailored jamming unit which applies polarization diversity modulation to the radiated jamming spectrum employing pseudo-noise multiplexed operation between two (or more) polarization state, at a rate and duty cycle sufficient to disrupt GPS operation when only one of the denial polarization states is suppressed at the receiver.

It is a general object of the present invention to provide a tailored jamming unit which encodes the polarization diversity of the jamming signal using an encryption algorithm for synchronous code/decode (CODEC) operation requiring matching encryption keys to achieve selective access based on code-of-the-day, time, coarse location, etc.

It is a further principal object of the present invention to provide a tailored interference suppression receiver unit which implements a denial interference nulling system for GPS that exploits the differences in apparent polarization of the encoded jamming signal at the user GPS receiver, to synchronize and suppress the inband denial interference signal using asynchronous decode processing and tandem adaptive cross-polarization nulling.

It is a further principal object of the present invention to receive the denial or jamming interference signal in the receive unit using one port of an adaptive antenna feed circuit having an RF polarimeter structure, to sample the denial signal so as to synchronously modulate the two-state encoded interference signal and GPS signals and to null each of the denial jamming interference signal polarization states in a time-multiplexed manner in the port to the user GPS receiver.

It is a further object of the present invention to either modify the insertion phase of the adaptive antenna circuit synchronously with denial suppression, so as to minimize unintentional phase modulation on the GPS signals to the user GPS receiver resulting from polarization multiplexing, and/or provide a switching signal representation of the decoded denial modulation pattern to the GPS receiver.

It is another general object of the present invention to detect the denial interference signals and control the adaptive nulling system without the need to process the GPS signal.

These and other objects of the present invention will become apparent when reference is made to the detailed description of preferred embodiments accompanied by the drawings.

DESCRIPTION OF THE PREFERRED EMBODIMENTS

Figure 1:
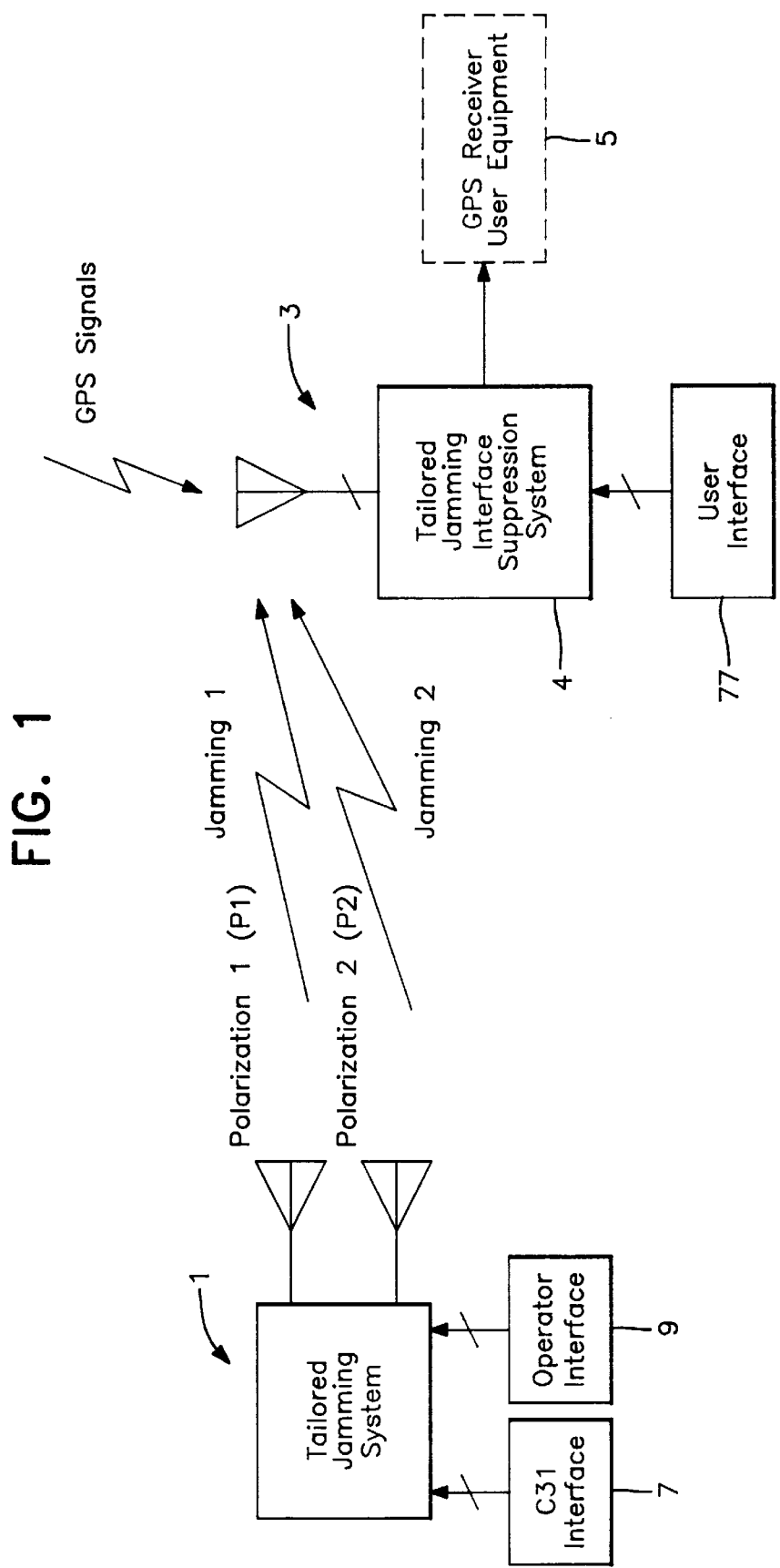
FIG. 1 is a top-level block diagram showing the tailored jamming concept for wide area/local selective denial for GPS signals.

A top-level block diagram of the GPS tailored jamming system for wide area/local selective denial of GPS signals is shown in FIG. 1. The system includes at least one tailored jamming system unit 1 and a matching tailored interference suppression receive unit 3 that interfaces with a conventional GPS receiver 5 for detecting the GPS signals after the interference/jamming signals have been suppressed. The transmit jamming signal radiated by the tailored jamming unit 1 comprises two GPS jamming waveforms, preferably each having distinct polarization states. The jamming waveforms are selected to interfere with, or jam, the GPS receiver user equipment operations. The jamming waveforms are preferably a wideband noise modulation in the GPS band so to prevent the use of filter techniques. A polarization encryption pattern is input into the jamming unit 1 through a C3I interface 7 and operator interface 9 in a manner to be described so as to multiplex, i.e. sequentially switch, the transmission of the jamming waveforms between the two or more different polarizations using a pseudo-noise encryption pattern having a switching rate and encoding sequence developed to make decoding, prediction and suppression difficult for users who are not supplied with the encryption pattern. The power level and radiation pattern of the tailored jamming waveforms are selected to provide local jam management and GPS denial for a defined area around the jamming unit 1 to provide selective availability. The encryption pattern is designed for code-of-the-day, geolocation, and time encoding requiring a matching key and algorithm at the receiver 3 to develop secure decode synchronization. The receive signal at the tailored receive unit 3, which includes the GPS signals and the polarization modulated denial jamming signals, is converted into orthogonal components to a tailored denial or jamming interference suppression unit 4. The interference suppression unit 4 is essentially the interference suppression or cancellation system as described in the Casabona et al. application, incorporated by reference herein, but modified to separately operate on each of the transmitted jamming waveforms in a manner to be described. The receive unit 3 detects, synchronizes and decodes the jamming waveform modulation keying or switching rate and suppresses the denial/jamming interference signal using polarization interference suppression techniques. The denial control loop of the receiving unit cross-polarizes the feed in tandem, i.e. coordinated to, the encoded keying pattern and nulls the denial interference jamming portion of the received signal to the GPS receiver user equipment. The receiver unit 3 compensates for processing phase modulation impressed on the GPS signals. The above-described system allows for a single jamming unit 1 to manage GPS availability in a region and permits multiple asynchronous tailored receive units 3 to operate in the denial jamming environment, although only a single receive unit 3 is depicted.

As is described in the incorporated Casabona et al. application, the interference or jamming signal suppression or cancellation technique may be explained by assuming that all transmitted and received signals, GPS signals and denial interference/jamming signals, are composed of vertical and horizontal polarized waves. The theory supporting the denial ortho polarization suppression or nulling concept is based on the property that any wave of arbitrary polarization can be synthesized or decomposed from/into two waves orthogonally polarized to each other. For example, a linearly polarized denial interference signal wave can be produced by the coexistence of a vertically and a horizontally polarized wave, with a 0° phase difference, having a tilt angle defined by the amplitude relationship of vertical and horizontal amplitudes. Thus, orthogonal polarization antennas can be used to match or mismatch a propagated denial signal using relative phase and amplitude modulations to combine the ortho components. For the case of a denial interference signal, the orthogonal polarization receive antennas can be used to mismatch the receiving system and effectively null the denial signal. In the present invention, if the denial or jamming signal waveforms are switched between two or more different polarization states, a synchronized receive antenna system switching in a similar manner between respective mismatches or nulls would effectively cancel the denial interference in the receiving system over time. A linearly polarized denial signal with a tilt angle from vertical of +5° would have an ideal vertical to horizontal orthogonal amplitude relationship of 10.6 dB and phase relationship of 0°, and a symmetric −5° tilt could be produced by radiating the horizontal polarized wave with a 180° phase shift. Thus a 180° modulation of the horizontal component of an ortho transmit system can result in a ±5° polarization tilt angle modulation.

As is described in the Casabona et al. application, the theoretical polarization mismatch loss obtained between the denial jam transmit and receiver systems, $\chi_{ref}$, can be calculated for any elliptically polarized transmit signal and any elliptically polarized receive antenna using the following relationship:

$$\chi_{ref} = 10 \log_{10} \left\{ 1/2 + 1/2 \left[ \frac{4\gamma_T\gamma_R + (1 - \gamma_T^2)(1 - \gamma_R^2)(\cos 2\beta)}{(1 + \gamma_T^2)(1 + \gamma_R^2)} \right] \right\}$$

where:

γ=ellipticity ratio, the signed voltage ratio of the major axis of the polarization ellipse to its minor axis, (1≦|γ|≦∞)
β=polarization mismatch angle, (0°≦β≦90°).
T=transmit; R=receive.

The receiver unit 3 of the present invention modulates the orthogonal received components of the denial interference signal and via detection and loop control creates a polarization mismatch against each separate waveform, i.e. each separate transmitted polarization state, of the interference signal in the signal path to the GPS receiver in accordance with the teachings of the Casabona et al. application. When the polarization states of the denial transmittal or jamming signal are sufficiently different, i.e. different tilt angles or axial ratios, a null created for one state would only modulate the other state. Therefore, the denial receiver unit 3 separately forms each null state for each separate transmitted waveform in conjunction with the keying or code modulation sequence.

Figure 2:
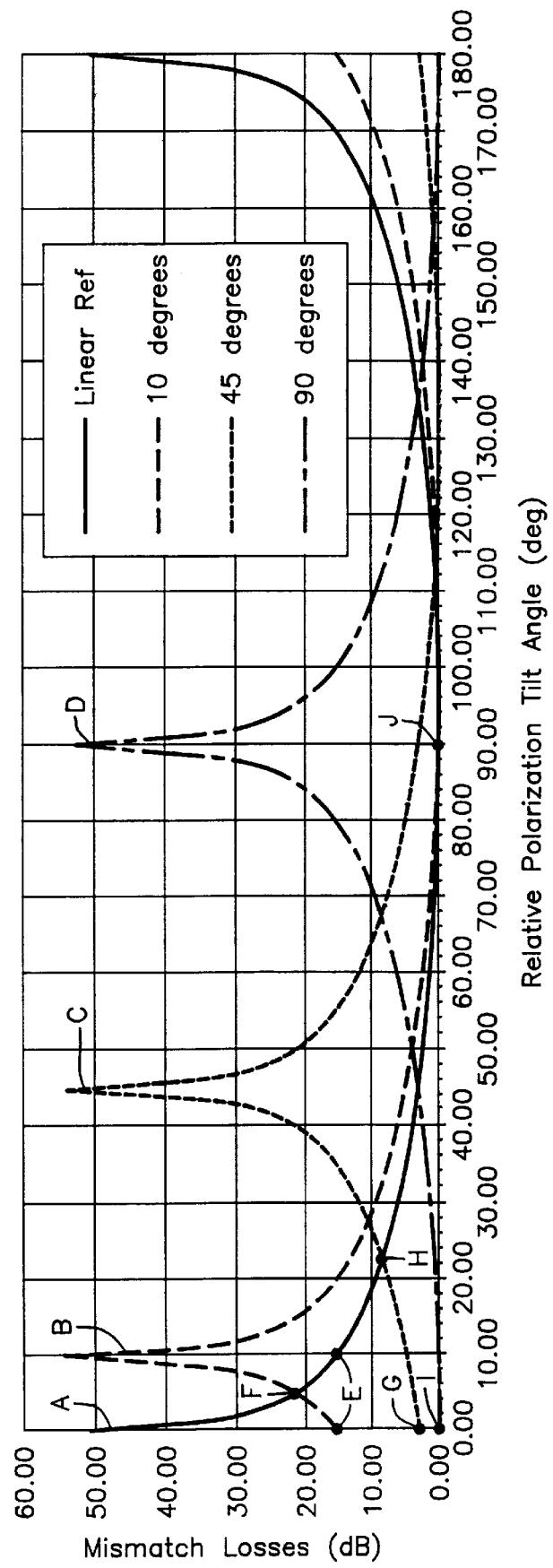
FIG. 2 shows a plot of the theoretical mismatch loss for various polarization tilt angles using a near linearly polarized jamming signal example.

Refer now to FIG. 2 showing theoretical mismatch loss relative to multiple state denial tilt angle settings for an ideally polarized elliptical signal having a 30 dB axial ratio. A family of 30 dB elliptical signal mismatch curves A, B, C, D are used as an example to graphically illustrate the variation in loss versus relative tilt angle using the same axial ratio in all cases for the invention. If we set the reference interference signal state at 0° relative tilt and then establish a rejection null to suppress a second signal having a 10° relative tilt angle, B, we see that a null established for each state, A and B, in turn produces a mismatch of about 15 dB, E, versus the alternate polarization state. A single null set at 5° between the two polarization states would establish a mismatch of about 21 dB, F, versus each polarization state. As the polarization states increase in relative tilt angle difference, we see the ability to null one state and attenuate the alternate state decreases. For a 45° (or ±22.5°) difference in tilt angle, A and C, one null condition only attenuates the alternate state by about 4 dB, G, and a single null at the median 22.5° results in attenuation of both states by about 8 dB, H. For the 90° (or ±45° ortho) case, A and D, one null condition attenuates the second (ortho) state by 0 dB, I or J. The objective of the denial jamming concept is to approach the 90° tilt limit case for the two states. This goal is limited by practical jammer antenna design and propagation constraints.

Figure 3A:
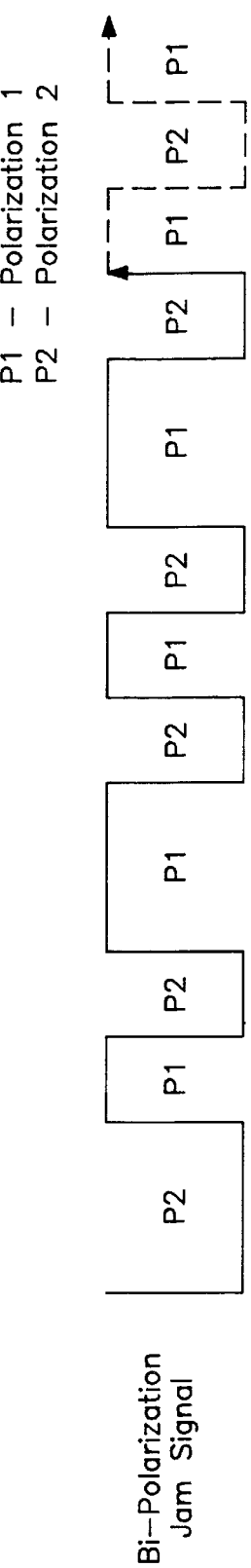
FIG. 3A illustrates a bi-polarization keyed (BPK), or coded, jamming pattern example for a radiated denial or jamming signal.
Figure 3B:
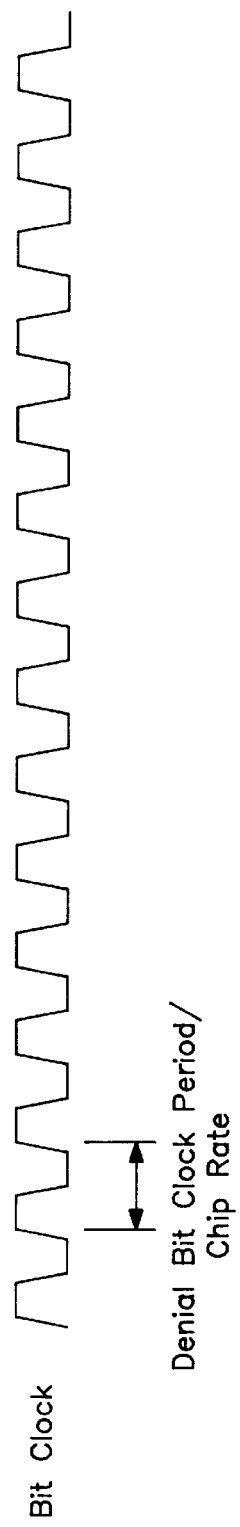
FIG. 3B shows the bit clock or chip rate relationship.
Figure 3C:
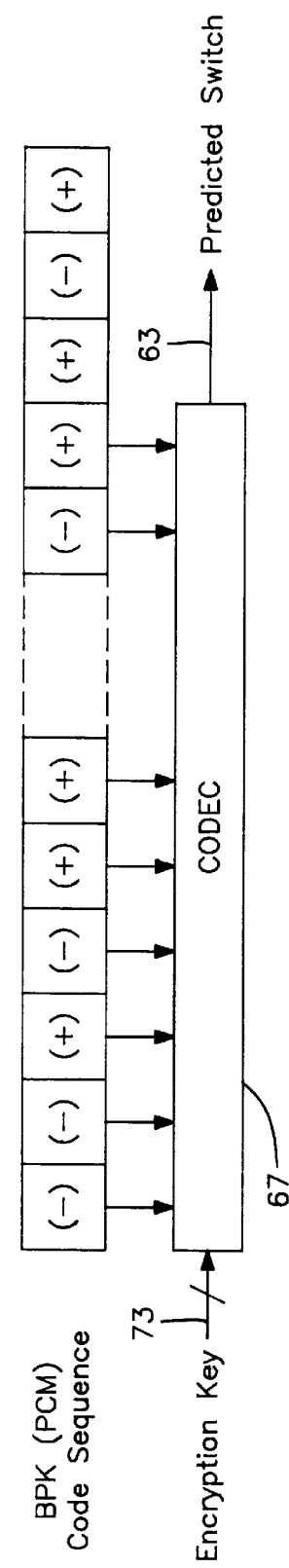
FIG. 3C shows the CODEC (code/decode) correlation using an encryption key to develop a predicted switching signal at the receiver unit.

FIGS. 3A–3C depict examples of a polarization coded jammer keying or code pattern for the invention using a bi-polarization keyed (BPK) approach. As depicted in FIG. 3A, the transmitted jamming signal waveforms are at two different polarization states, P1 and P2, and are transmitted, and received, at an encoded or encrypted code or key sequence that switches between P1 and P2. As shown in FIG. 3A, the code is P2-P2-P1-P2-P1-P1-P2-P1-P2-P1-P1-P2, etc. The duration of each polarized wave transmission is determined by a bit clock, as shown in FIG. 3B. The system for obtaining the particular code sequence and input of the bit clock rate will be described hereinbelow. The denial/jammer bit clock or chip rate is selected for the greatest interference with the GPS code rate.

The propagated jamming waveform sequence is intended to be asynchronously decoded by one or more receivers 3 equipped with an interference suppression unit (ISU) 4 and having access to the encryption keys (enabling codes). The code sequence that is generated by the jamming unit 1 is provided by a code sequence using operator inputs via the operator interface 9 and C3I (communications, command, control and information) network inputs via the C3I interface 7. The C3I network is a known secure communications network that provides a particular code of the day and the exact time of the day. As shown in FIG. 3C, the receiver unit 3 has access to the code sequence or encryption key (via line 73). The decode algorithm or encryption key implemented in the receiver unit synchronizes to the transmitted clock rate and decodes the sequences to produce a predictive switch control signal (over line 63) to run tandem suppression loops to null P1 and P2. That is, the receiver unit includes a code/decode (CODEC) chip 67, which is well-known to those skilled in the art, that provides a predicted switch sequence, as shown, so as to modulate or switch the receiver to suppress each of the P1 and P2 jamming waveforms, as will be further described. The CODEC chip determines the predicted switch sequence from the encryption key code (over 73) that was supplied to the user of the receiver and from detection of the bit rate and code sequence, or its complement, which is derived from detecting the jamming waveform transitions. (This is represented by the "+" and "−" sequence in FIG. 3C.) The CODEC 67 aligns or matches up the detected or received code sequence with the encryption key over 73 to obtain synchronization and the encryption key code, when aligned or synchronized, is applied as the predicted switch sequence output (over 63) to enable jamming signal suppression, to be described below.

Figure 4:
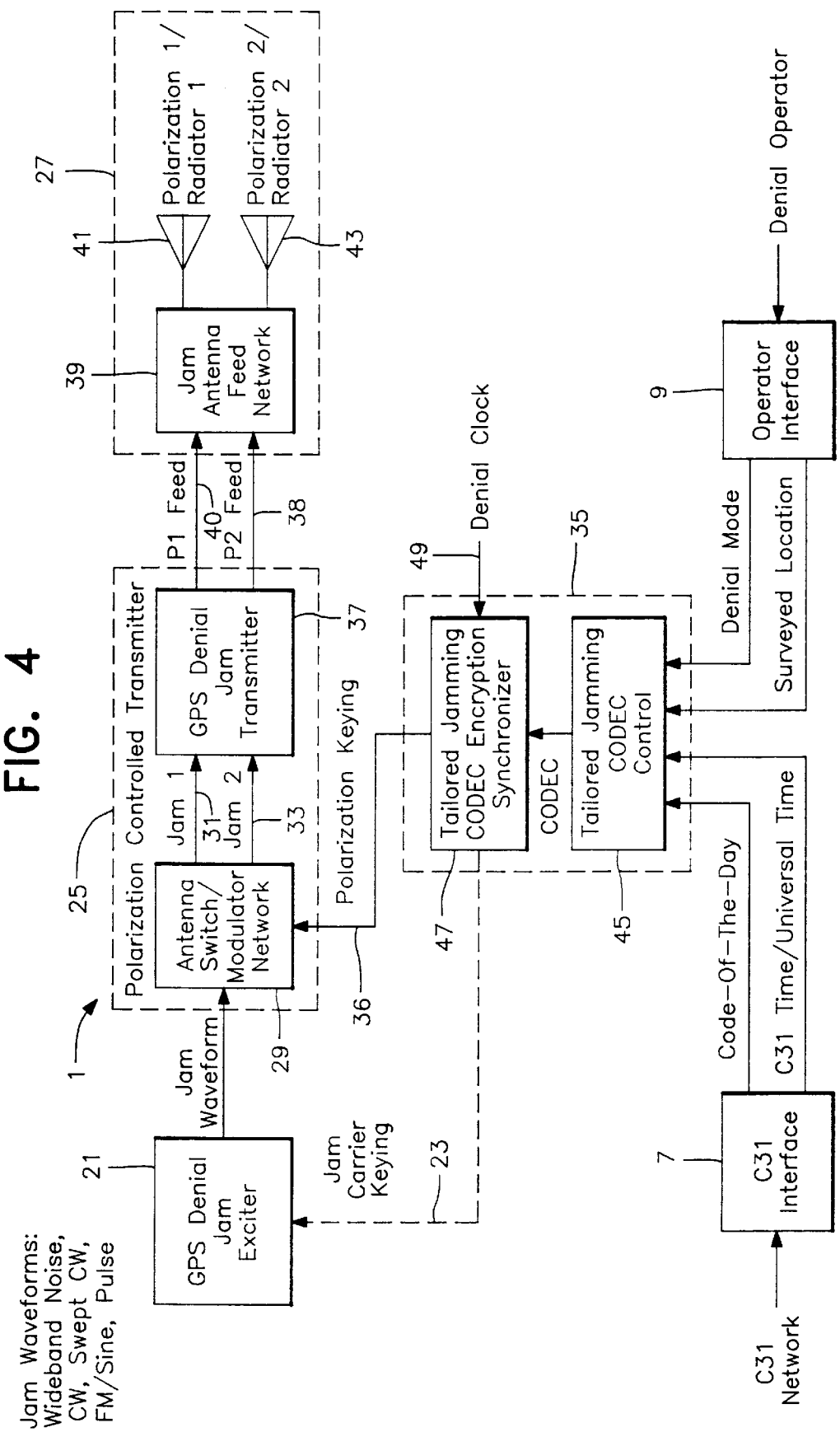
FIG. 4 illustrates one preferred embodiment of the wide area/local GPS tailored jamming unit of the present invention.

FIG. 4 depicts a preferred embodiment of the tailored jammer unit 1 for the invention. The jammer unit 1 includes a jam exciter 21, which may be a conventional oscillator, which generates a denial jam waveform. The exciter 21 preferably produces a wideband noise waveform which is designed to interfere with the C/A and/or P(Y) modes of GPS receiver operation. The exciter 21 may produce additional L-band jamming waveforms and modulations including: CW, swept CW, FM/sine, pulse, et al. that may alternatively be used. These waveforms can also employ additional carrier keying techniques for encryption via line 23. The jamming waveform from exciter 21 is provided to a polarization controlled transmitter 25 which interconnects the exciter 21 to a polarization diverse transmit antenna system 27. The transmitter 25 includes an antenna switch/modulator network 29 that provides or switches the jamming waveform over two outputs 31, 33, the switching in accordance with a polarization keying code from a jamming CODEC encryption/control circuit 35. The two jamming waveforms are applied to a denial jam transmitter 37 which amplifies the denial or jamming signals for the desired ERP interference level. The amplified P1 and P2 feed signals are input via 38, 40 into the transmit antenna system 27 to produce two or more polarization states for the propagated waveforms. The polarization diverse transmit antenna system 27 radiates the denial or jamming waveforms at two different polarization states. The transmit antenna 27 includes an antenna feed network or coupler 39 and antenna radiators 41, 43. The antenna 27 may use an array of L-band radiators having different polarization properties and a switched feed, or a dual ortho-feed arrangement that generates polarization diversity by modulating the input feed signals. The antenna feed network uses passive circuits to interface the transmitter to the antenna and establish the amplitude and phase transfer properties for the desired denial polarization attributes.

The polarization keying code supplied over line 36 to the polarization controlled transmitter is obtained as follows. The jammer unit includes an operator interface 9 and a C3I interface 7. The interfaces include interface output lines to a jamming CODEC control chip 45. The user or operator of the jamming unit 1 may manually select the system's mode of operation, i.e. if the selective denial mode is to be chosen or alternatively simply a jamming signal transmission mode that may not be encrypted and that jams all GPS receivers. The operator may select the location over which the jamming unit may operate, such as by selecting the radiated power levels, etc. Essentially, the operator interface can be designed to permit a range of operator controlled options. The C3I interface 7 receives the code-of-the-day and exact time through the known C3I network, as discussed above.

The encrypted key or code-of-the-day is input into the tailored jamming CODEC control chip 45 to provide the encrypted code to a CODEC encryption synchronizer 47, the latter of which receives a jamming or denial clock input 49. The synchronizer 47 controls the encryption code rate. (See FIGS. 3A–3C.) That is the encryption code or key from CODEC control 45 is synchronized or switched at a switching rate set by the denial clock rate over line 49.

The polarization keying control signal over line 36 is thus derived from the selected denial clock rate (over line 49) and an encryption algorithm or key (from 45) which is designed for security and management of selective access.

The CODEC jamming control 45 generates and manages the encrypt ion, and the synchronizer system 47 produces the keyed polarization switch control via line 36. Clock and code variation rates would be selected to match processing in the denial receiver unit 3 and vice versa. As an example, the radiated denial jam waveform may consist of a 20 MHz noise spectrum set to L1 optimized to interfere with GPS receiver operation; use a keyed polarization rate of 500 KHz to interfere with C/A processing; switch between two linear jammer polarizations at +22.5°/−22.5° tilt angle, A and C, to the vertical to keep a jammer-to-signal ratio>8 dB, H; use a peak ERP level of 10 W to limit denial range to 20–50 km, maximum.

Figure 5:
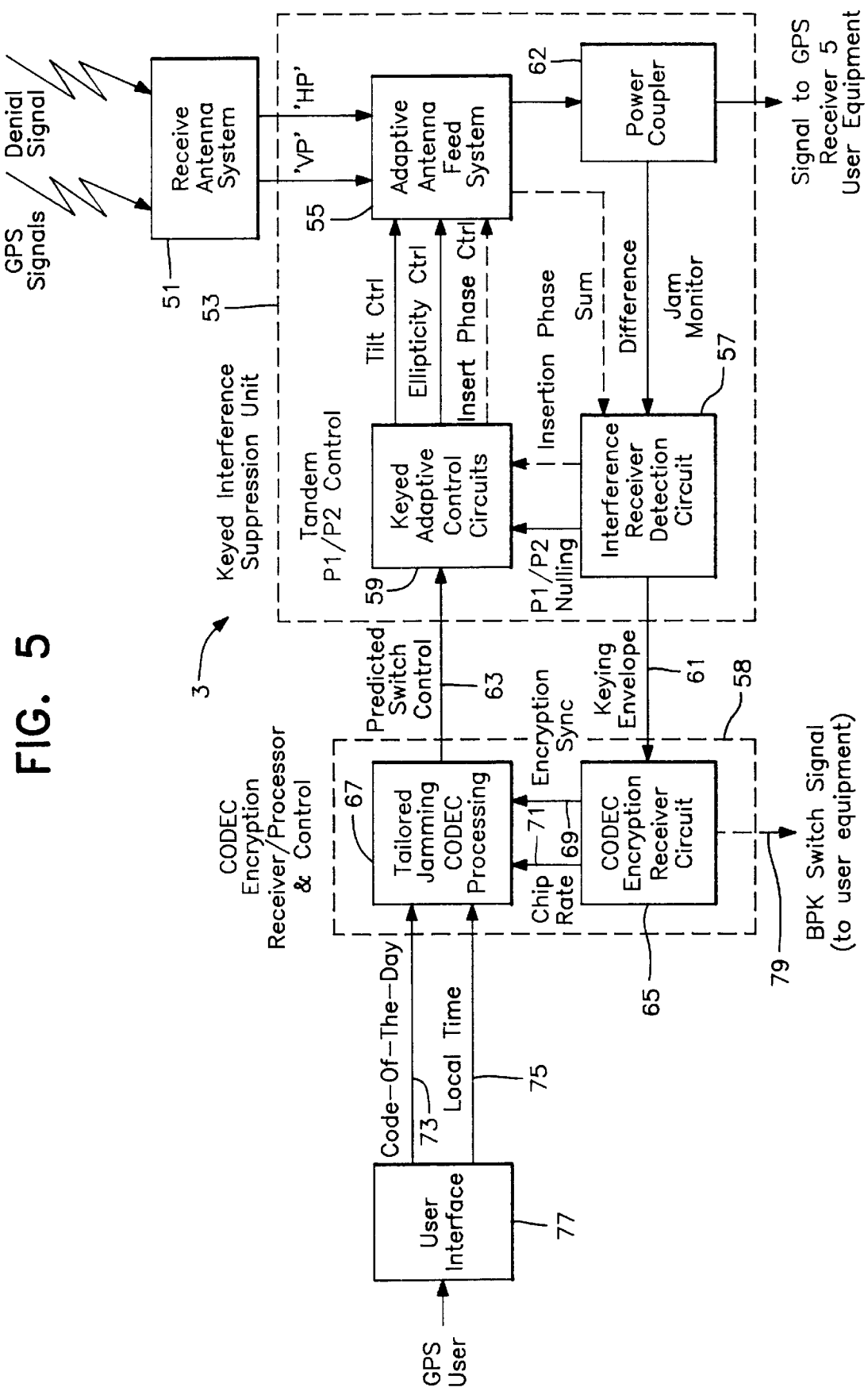
FIG. 5 illustrates one preferred embodiment of the GPS tailored jamming interference suppression receive unit of the present invention.

FIG. 5 is a block diagram for a preferred embodiment of the tailored receiver unit 3 of the invention. The receive antenna system 51 receives the denial jamming waveforms and the GPS signals and provides an orthogonal pair of received signals VP, HP or equivalent to a keyed interface suppression unit (ISU) 53 which suppresses the denial or jamming signal to provide the GPS signals to the GPS receiver equipment. The keyed interference suppression or cancellation unit 53 is substantially identical to that described in the Casabona et al. application but modified to permit the cancellation or suppression of each separate interference/jamming signal P1, P2. The interference suppression unit 53 includes an adaptive antenna feed system 55 which is essentially a polarimeter adjusted to null the polarization of the interference source, in this case the denial jamming waveform, an interference receiver detection circuit 57, and keyed adaptive control circuits 59. Since denial jamming of the present invention uses at least two switched polarization waveforms, the signal observed at the receive antenna 51 will exhibit polarization modulation modified by propagation and antenna effects between the jammer 1 and receiver 3. The interference detection circuit 57 monitors a sample of the signal supplied to the GPS user equipment 5 via a power coupler 62. Initially, for denial jamming, the interference receiver detection circuit detects the presence of a jam signal in the GPS band and determines whether the signal exhibits denial modulation. This modulation displays itself at this point as a high signal level having a detectable amplitude modulation at the denial bi-polarization keying (BPK) rates. The amplitude modulation results from the polarization encoding and the different matching losses between the states for a stable receive unit 3 polarization setting. That is, the interference receiver 57 detects a high signal level, indicating that a jamming signal has been detected, and detects that the high signal level is being modulated or switched. The set values of the adaptive antenna feed system may be adjusted to improve the initial percent modulation for denial detection and synchronization. The receiver detection circuit 57 provides an envelope of the detected denial signals as an input to a CODEC encryption receiver/processor and control unit 58 via line 61 for BPK decoding and synchronization, and returns a predictive switch control keying signal via line 63 to the keyed adaptive control circuits 59 which is used for timing the tandem P1/P2 nulling process. The receiver detection circuit 57 and the adaptive control circuits 59 establish multiple null control loops (as opposed to only a single control loop of the Casabona et al. application) operated in conjunction with the predictive switch signal to suppress each state of the denial signal. Essentially each transmitted polarization state waveform P1, P2 is nulled by iterative adjustment of the tilt and ellipticity controls to the adaptive antenna feed system in time multiplex. The keyed predicted switch control provides multiplexed analog or digital control drives to each variable phase modulator. The loop timing and predictive signal phase are adjusted to correspond.

The CODEC encryption receiver/processor and control 58 processes the detected denial keying envelope from the receiver detection circuit 57 so as to obtain the bit clock rate and decode the jamming keying pattern. That is, a CODEC encryption receiver circuit 65 receives an envelope of the received jamming signals from the receiver detection circuit 57, which is of substantially the same shape as exemplified in FIG. 3A, and provides the detected code sequence (see FIG. 3C) to the tailored jamming CODEC processing circuit 67, via line 69. Further, the circuit 65 derives the chip rate or bit clock period from the envelope (as shown in FIG. 3B) and provides this bit clock or chip rate to the CODEC processor 67 via line 71. This is easily accomplished by looking at the envelope transitions of the FIG. 3A waveform. As exemplified in FIG. 3C, the CODEC processor 67 receives the encryption key code (code-of-the-day), via line 73, as well as the local time via line 75 which assists in matching or aligning (i.e. synchronizing) the encryption code with the detected code sequence. The CODEC processor 67 synchronizes the detected code sequence with the encryption code to, in essence, align them to enable the encryption code to form the predicted switch control signal over line 63. That is, the tailored jamming CODEC processor 67 applies a decode algorithm to generate a predictive keying or switch control to synchronize the loop nulling process.

The code-of-the-day or encryption code, as well as the local time information is input through the user interface 77 by the GPS equipment user. Only authorized GPS users are provided with the code.

The received jamming signals are suppressed in tandem, i.e. are coordinated with the predictive switch control signal to separately null each jamming signal waveform. An ancillary effect of the tandem nulling process (in hardware) is signal modulation resulting from the switched insertion phase of the ISU circuit when operating in tandem polarization switching mode. This modulation can affect the GPS signals. Three alternate methods may be used by the invention to correct the condition: (1) The receiver/processor and control function unit 58 provides the BPK switch signal envelope to the GPS receiver for phase equalization of the GPS signal in GPS processing, via line 79; (2) the control function unit 58 utilizes a preprogrammed calibration table of nominal insertion phase versus setting to compute the delta phase based on the tandem controls—the compensating phase modulation is applied to the ISU output signal using an additional variable phase modulator and tandem control timing; or (3) the control function enables an internal equalization loop using a CW calibration/test oscillator in the keyed ISU (at a frequency near the GPS band) which observes the insertion phase modulation in the GPS path. A calibration receiver mode in the receiver/processing and control function examines the high frequency properties of the test signal, and using an additional variable phase modulator in the ISU output, adjusts an insertion phase equalization loop in the ISU to minimize modulation. These approaches can be used to equalize the phase modulation on the GPS signals.

After denial states are suppressed below acceptable thresholds, the receiver unit 3 corrects the unit for potential insertion phase modulation on the GPS signal. The receiver unit 3 may apply one of the three approaches described above to minimize the modulation. If the GPS user equipment is capable of processing the modulation, the BPK switch output is processed in the GPS receiver. If the preprogrammed calibration table approach is used, the adaptive control examines the nominal insertion phase of the denial states and uses the phase difference to modulate a variable phase modulator in series with the output signal to the GPS user equipment to produce a compensating modulation. If an internal equalization approach is used, a representative test signal is injected into the ISU inputs and a variable phase modulator in series with the output signal to the GPS user equipment is adjusted at the keying rate over line 63 until the bandwidth of the detected test signal at the output is minimized. The latter approach uses a calibration receiver mode to monitor and control an insertion phase equalization loop in the ISU.

Figure 6:
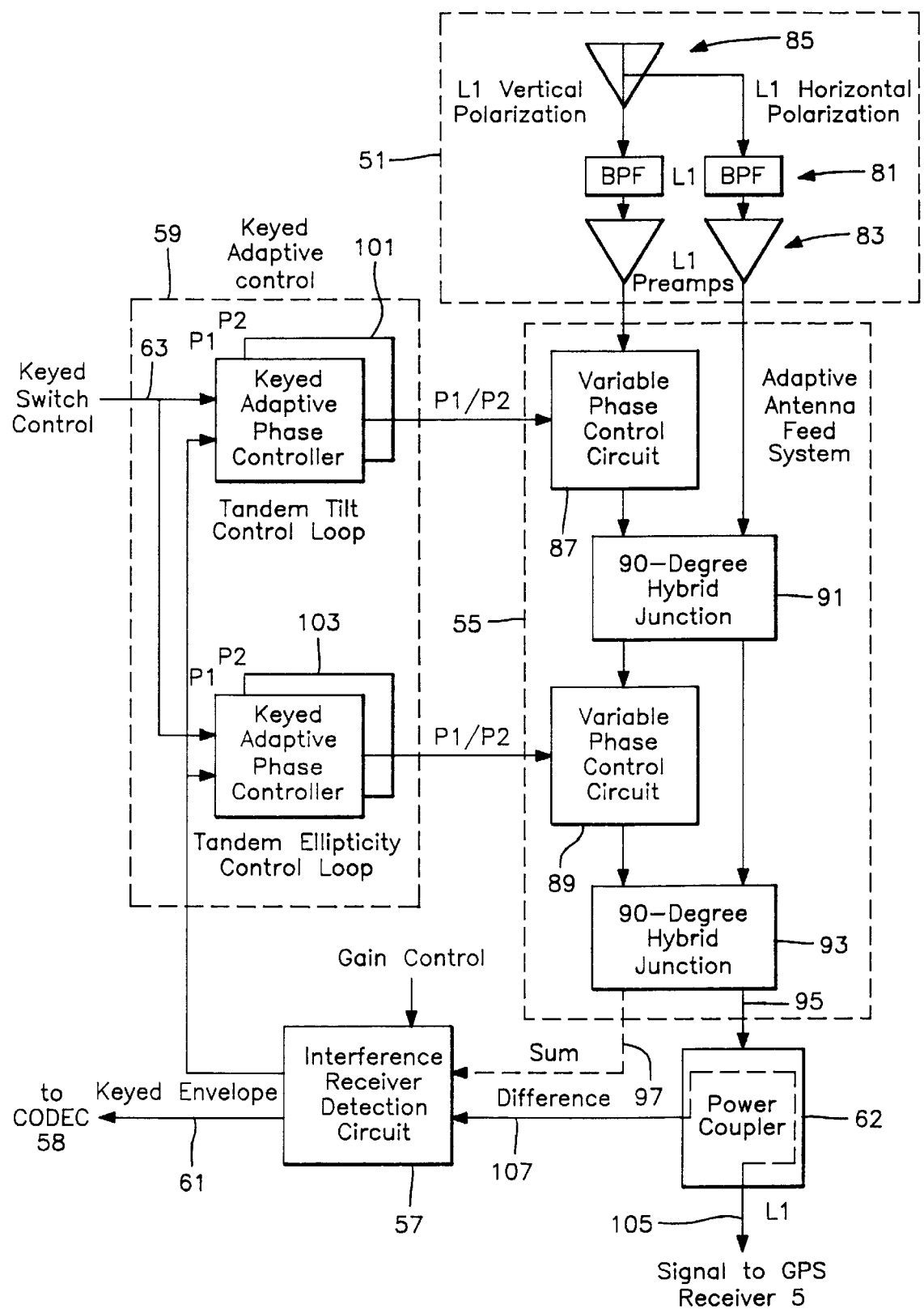
FIG. 6 illustrates one preferred embodiment of a keyed interference suppression unit consisting of a shared polarization modulator using tandem tilt and ellipticity control loops.

Refer now to FIG. 6 which depicts the structure of the interference suppression unit (ISU) 53. The basic operation of the ISU is described in the Casabona et al. application. The receive antenna system 51 includes filters 81 and preamplifiers 83 which interface with orthogonal antenna system 85. Orthogonally polarized inputs are provided to the adaptive antenna feed system 55, which includes a solid state polarimeter formed from variable phase control circuits 87, 89 and a pair of 90-degree hybrid junctions 91, 93. (Only two phase control circuits 87, 89 are depicted to simplify the polarimeter structure; as described in Casabona et al., each of the two inputs to each hybrid junction 91, 93 may include the phase control circuits.) Channel bandwidth, noise figure and insertion loss are set by the arrangement of bandpass filters 81 and low noise RF preamplifiers 83. The polarimeter modulator utilizes a 90-degree hybrid architecture. Two sets of modulated phase controls 101, 103 are used to control the tilt and ellipticity of the network, and the second hybrid junction 93 provides a difference 95 and sum 97 output port. The sum output is not used in this implementation. The difference port output 95 is sampled in an RF power coupler 62. One output 105 is provided to the GPS user receiver equipment 5. The second output port 107 is the null monitor port and is connected to the receiver detection circuit 57.

The keyed adaptive phase controllers 101, 103 illustrate the case of two tandem nulling loops for P1 and P2. The keyed jamming predictive switch control signal via 63 provides the synchronization signal used to multiplex the P1 and P2 loops. The receiver detection circuit 57 and the adaptive antenna feed system 55 are the common elements of the multiplexed loop. The keyed adaptive phase controllers 101, 103 functionally provide tandem tilt and ellipticity control loops. The adaptive phase controllers 101, 103 utilize synchronous encoding and digital signal and control system processing techniques to process the jam monitor signal on line 107 to develop the keyed control signals to the ISU phase shifters and gain control. That is, the keyed adaptive phase controllers 101, 103 separately null or suppress the P1 and P2 jamming signals in accordance with the keyed switch control signals over line 63.

Figure 7:
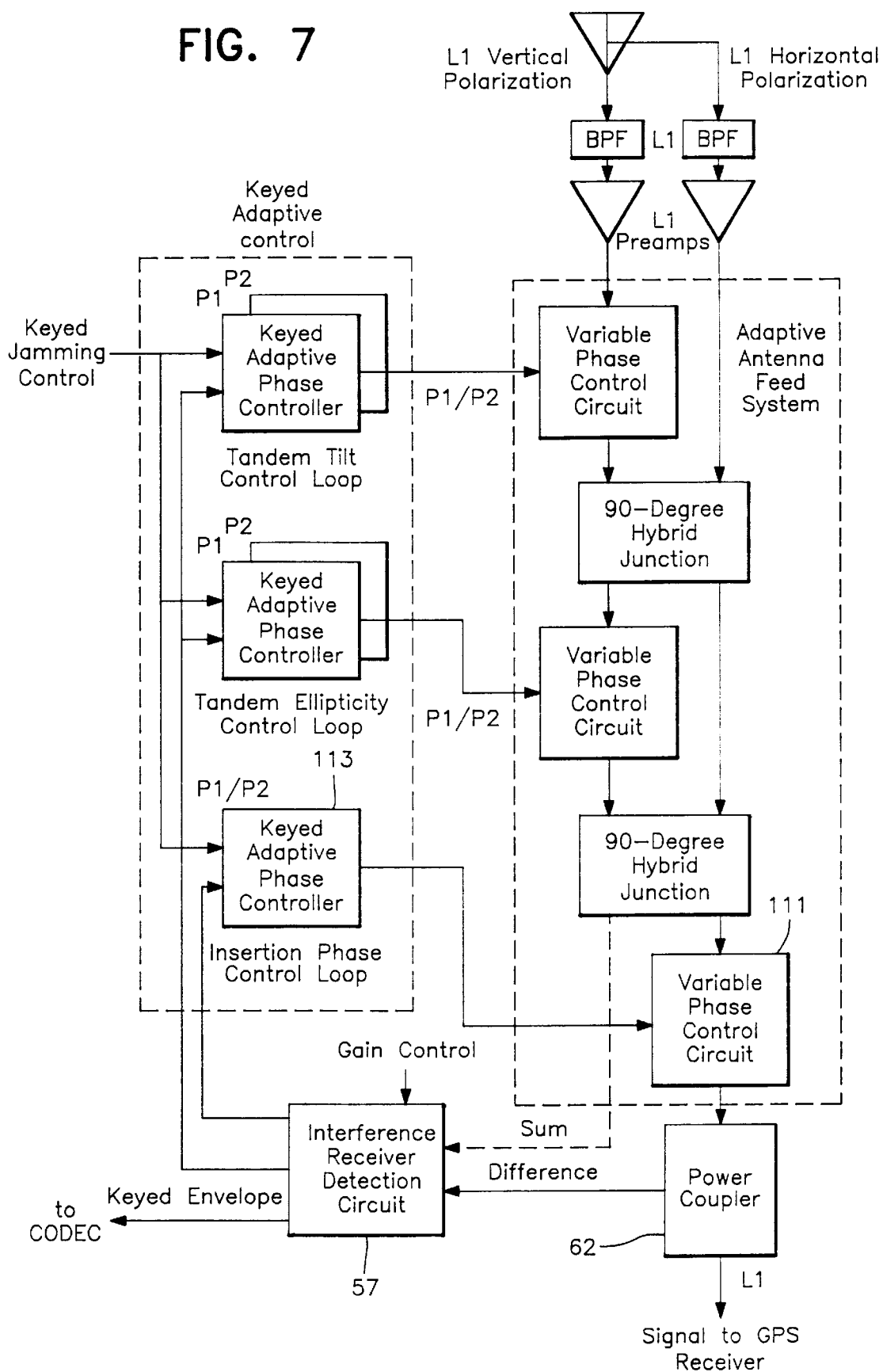
FIG. 7 illustrates one preferred embodiment of the keyed interference suppression unit which includes a phase shifter structure that allows for insertion phase correction of the GPS signal passing through the polarization modulator using a computed equalization from preprogrammed calibration information.

FIG. 7 depicts an embodiment of the keyed ISU with the addition of an insertion phase control loop to the unit in FIG. 6. This figure illustrates the added variable phase shifter 111 for phase equalization in series with the output signal to the power coupler 62 and then to GPS user equipment 5. A keyed adaptive phase controller 113 is part of a control loop including circuit 57, variable phase control circuit 111, and coupler 62, which loop minimizes the phase modulation on the signal output. The loop shares functionality with the tilt and ellipticity control loops. The phase equalization loop synchronously applies a difference modulation during one denial state of the keying. The nominal difference modulation in this embodiment is calculated from a preprogrammed table of nominal difference signal insertion phases for each denial state setting, and applied during a keying phase. The alternate cycle is a zero phase modulation.

Figure 8:
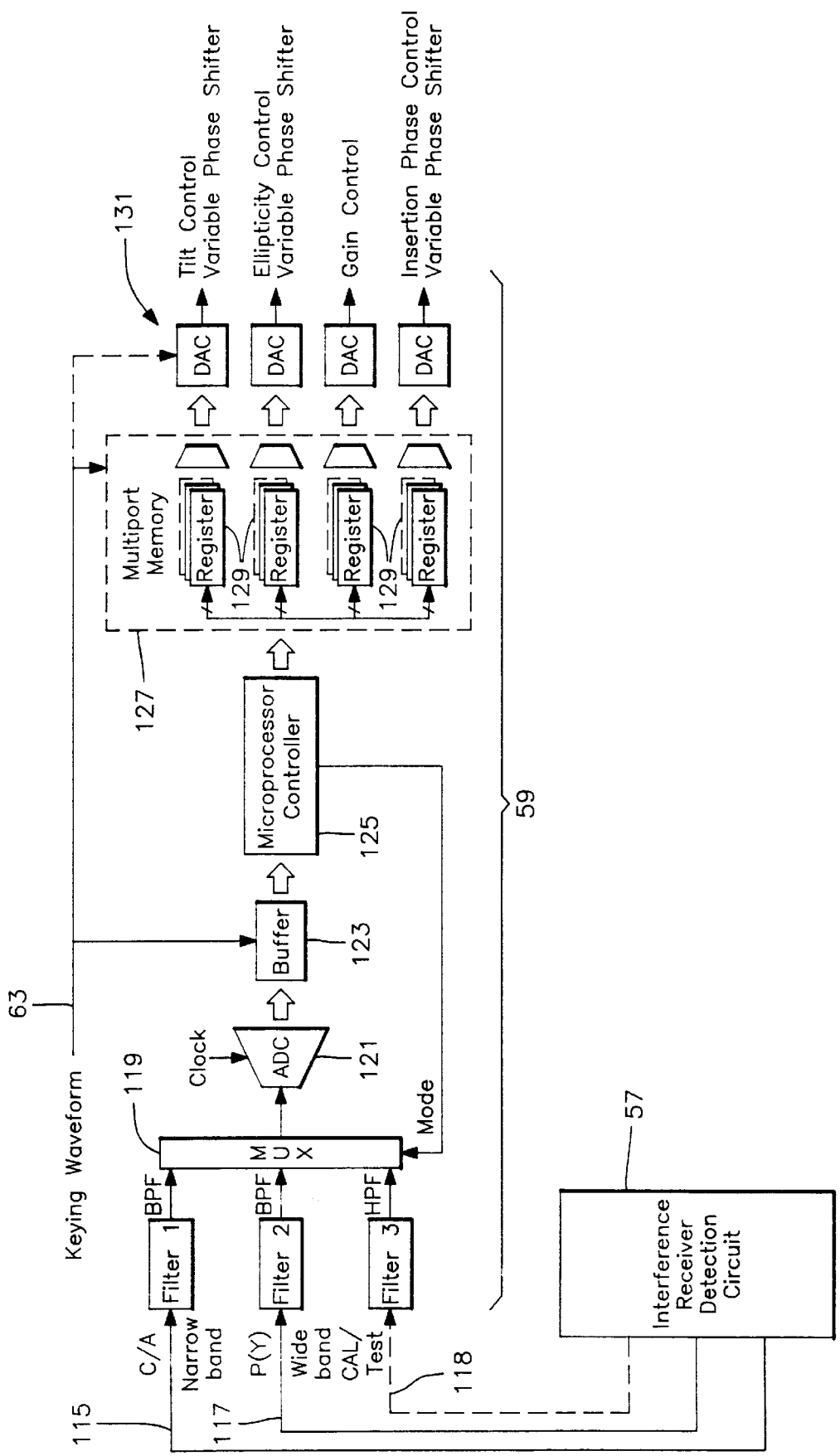
FIG. 8 illustrates the keyed adaptive control pipeline processing flow for multiplexed denial operation using filtered signals from the interference receiver detection circuit to key synchronized phase shifter and gain control signals.

FIG. 8 is a keyed adaptive control processing flow diagram for the keyed adaptive phase controllers 101, 103, and 113. The inputs over lines 115, 117, 118 are narrow band or wide band GPS and calibration/test inputs from the receiver detection circuit 57 and the keyed switch control signal is over line 63. The implementations of the adaptive control employs an analog multiplexer 119 to sample the receiver detection circuit video output using optimum filter constraints, a common analog-to-digital converter (ADC) 121, multiplexed buffer memory 123 for synchronized data acquisition, a common microprocessor controller 125, multiport memory 127 for output tilt, ellipticity, gain, and insertion phase storage registers 129 that are multiplexed to digital-to-analog converters (DAC) 131 to drive ISU tilt and ellipticity phase shifters, the insertion phase shifter, and a gain control modulator. Multiplexing uses the denial keying signal 63. Filters shown include C/A bandpass, P(Y) bandpass (denial bandpass), and denial CAL/test equalization highpass. The microprocessor 125 runs the denial detection and processing algorithm in addition to normal interference detection and suppression as described in Casabona et al. The microprocessor selects the filter and processing mode. A multiport memory 127 provides an array of registers for DAC control. Registers are organized by denial state i.e. P1 and P2, and multiplexed to the DAC's using the keying modulation from the shift control signal over line 63. When denial jamming is detected, the controller 125 may modify the ISU setting to improve denial detection and decoding. The microprocessor 125 executes the system nulling algorithm for each state of the denial interference P1, P2 to accomplish and maintain suppression. (The above system, excluding, of course, the multiplexing and associated buffer multiport memory is described in Casabona et al.)

Figure 9A:
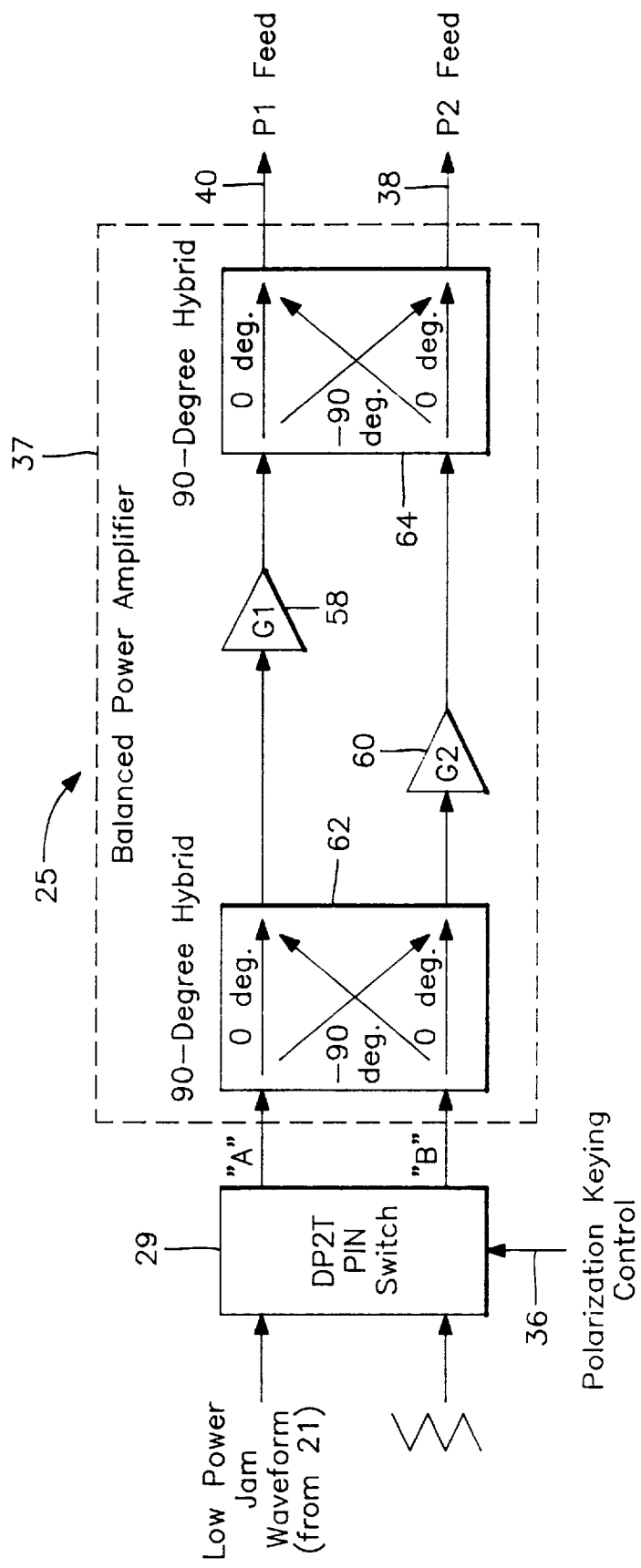
FIGS. 9A and 9B illustrate alternate polarization controlled transmitter techniques or structures which utilize the balanced amplifier configuration for higher power and allow high speed keying modulation and control on low power jam waveforms.
Figure 9B:
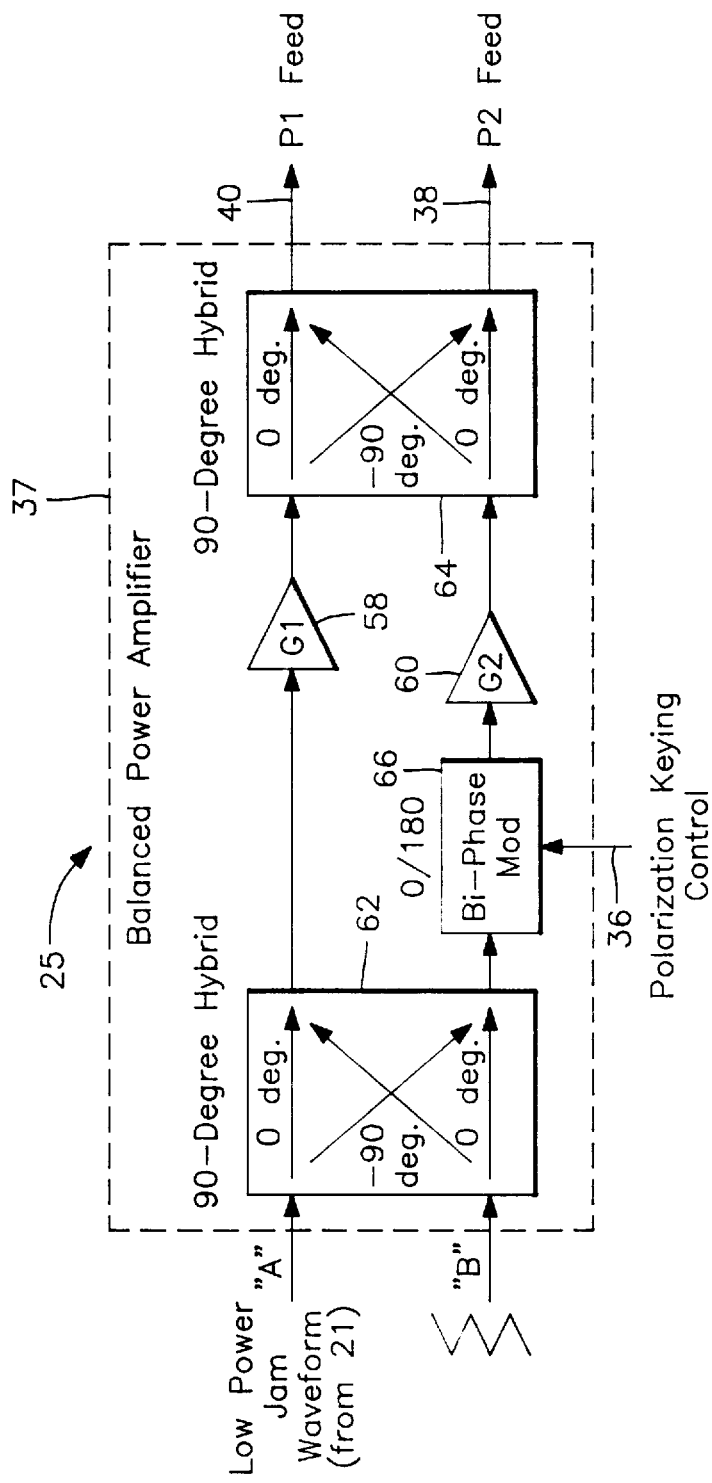

FIGS. 9A and 9B show two alternate embodiments of the jamming unit 1 polarization controlled transmitter 25, the first (FIG. 9A) using a switched scheme, and the second (FIG. 9B) using a biphase modulator scheme. The polarization property of the denial jamming is determined by the design of the transmit antenna and feed system 27. Two antenna feed ports would generally be used which are either switched or modulated. FIGS. 9A and 9B illustrate a high performance switching method which uses a balanced amplifier architecture 37 comprising two electrically similar amplifiers or transmitters 58, 60 whose inputs and outputs are combined in 3-dB hybrid couplers 62, 64. The characteristics of the hybrids provide a combined amplifier module with good impedance match at input and output with good phase and amplitude characteristics, and good power handling ability. By using a balanced amplifier module 37 as shown, high power amplifiers can be constructed by paralleling lower power stages using the hybrid technique, and high speed modulation can be implemented at intermediate low signal levels.

The two embodiments illustrated by FIGS. 9A and 9B apply the principles of the balanced amplifier. For the switched configuration of FIG. 9A, the low power jam waveform from the exciter 21 when switched to input port "A" (as controlled by keying control signal over line 36) results in the output transmitted signal appearing at the P2 port 38, and a low power jam waveform when switched to input port "B" results in the output transmitted signal appearing at the P1 port 40. For the biphase modulated configuration of FIG. 9B (which may be fully substituted for the block 25 of FIG. 4), a low power jam waveform from the exciter 21 applied at input port "A", results in the output transmitted signal appearing at P1 and P2 ports for bi-phase modulator settings of 180°0 and 0°, respectively by unit 66. These approaches allow for high performance, high speed modulation to the antenna at high encoding rates.

Figure 10:
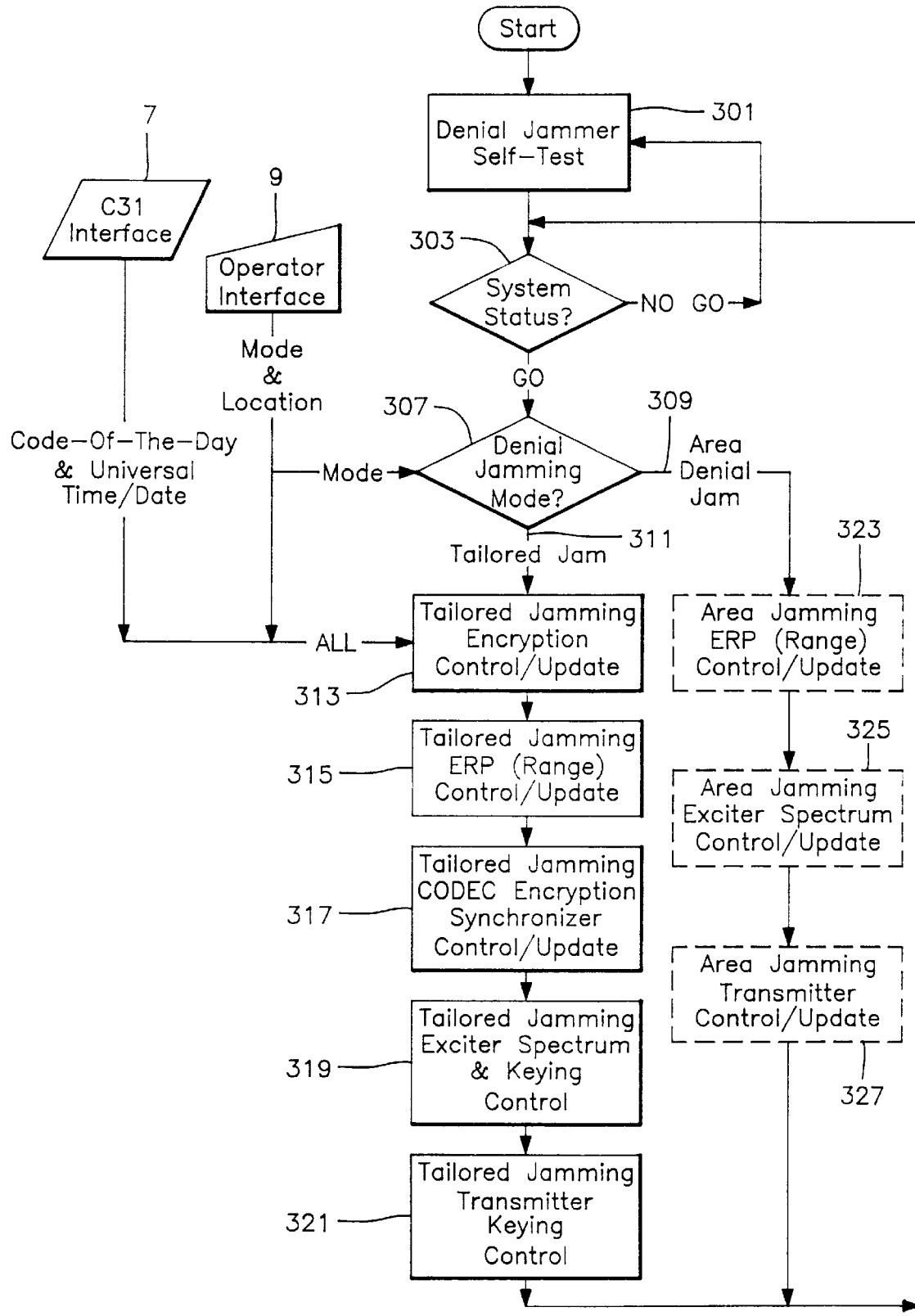
FIG. 10 illustrates the GPS denial top-level control algorithm for the tailored jamming unit of the invention.

FIG. 10 depicts a top-level control flow chart for management of the GPS denial jamming unit 1. The procedure controls and manages the operation of the jamming unit 1 to produce tailored denial GPS jamming for protection and local selective availability, as well as area denial jamming (shown dotted) without selective access. The control and management functions are performed by a computer control system (not shown) within the CODEC control system 45. The flow chart includes procedures for system self-test, system interface, and jammer real-time management depending on prevention mode, status and command data. The initial procedure performed by the jamming system control is a self-test 301, 303 to determine jamming unit status. The test procedure includes a series of initial system power turn-on and operator initiated radiated power tests of the major components: control processor, program, interfaces, exciter, transmitter, antennas, etc. The procedure then conducts continuous background test monitoring of system status. The interface procedure operates on inputs from the operator interface 9 for denial mode and technique selection, and data entry for denial location, time/date, and selective access specifics; and inputs from the C3I interface 7 for current authorization code and time/date synchronization information. The C3I interface 7 can provide coordination information for multiple denial jammers using time slot assignment commands. The procedure determines the jamming mode 307 selected by the operator, the technique and status, and locally enables the area denial 309 or tailored denial 311 jamming modes. In area denial mode the system simply denials GPS availability to all users without selective access or encryption. In the tailored mode, the denial technique allows for selective operability as described above.

In the tailored jamming mode, the encoded sequence and the encryption key timing is set in accordance with the inputs from the operator 9 and command/time information from C3I 7 (block 313). The jam transmitter output power and effective radiated power (ERP) parameters are set to a nominal tailored interference range around the jammer (block 315). The CODEC encryption synchronizer is set to select the bit rate for denial and provide the modulation timing waveforms for the exciter 21 and polarization control transmitter 25 (block 317). The tailored jamming mode control also manages the exciter 21 spectrum parameters by selecting jamming techniques and jamming waveform parameters (block 319). Additional carrier keying techniques may be enabled in addition to the tailored denial technique. The tailored jamming mode control enables and modulates the transmitter to manage the interference radiation pattern and command timing for coordination (block 321).

The area denial jam mode control operates in a similar manner but without encryption and synchronization. In area denial jam mode, the system provides a regional jamming waveform to deny all GPS receivers access. The transmitter output power and ERP parameters are managed (block 323) to set the nominal interference range of the jammer. The exciter spectrum parameters are set to select the jamming techniques and jamming waveform parameters (block 325). The area denial jam mode control enables and modulates the transmitter to manage the radiated pattern and timing (block 327).

In addition to the fundamental tailored jamming and area denial control functions, the procedure includes an update procedure which adapts the jammer unit control to changes in interface inputs and jammer status.

Figure 11:
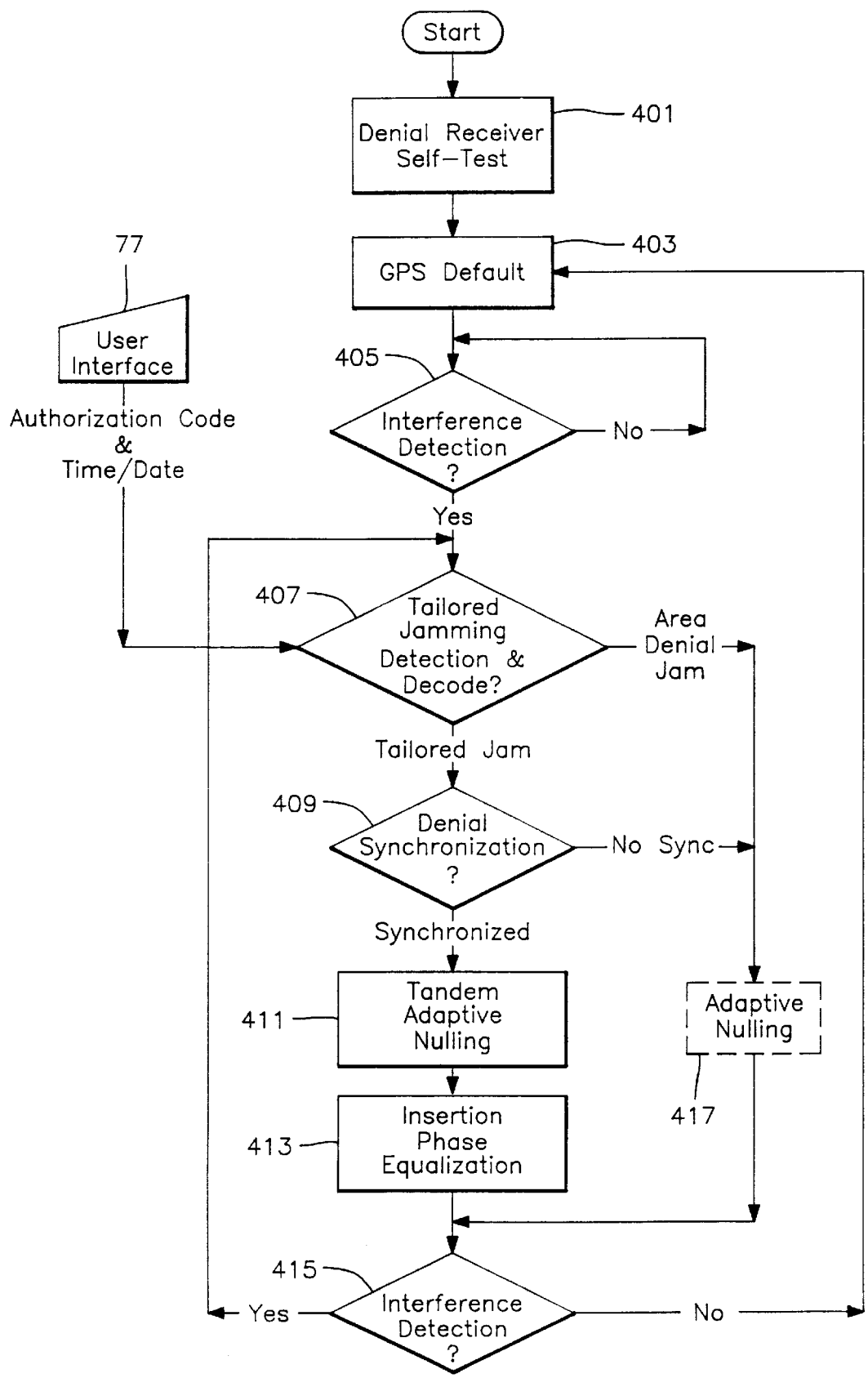
FIG. 11 illustrates the GPS denial top-level control algorithm for the tailored jamming receive unit of the invention. The figure shows the detection, cancellation and control flow for tailored denial interference.

FIG. 11 depicts a top-level control flow chart for management of the GPS denial receiver unit 3. The procedure controls and manages the operation of the receiver unit 3 to detect and process tailored denial GPS jamming for coordinated selective availability, as well as general area interference suppression (shown dotted). The control/management system is computer controlled and is within the CODEC encryption receiver/processor and control 58. The flow illustrated consists of procedures for system self-test, user interface, tandem adaptive nulling management depending on tailored jamming detection, and insertion phase equalization. The initial procedure performed by the jamming system control is a unit self-test to determine denial receiver status (block 401). The procedure sets the ISU GPS default condition to a nominal GPS receive mode for RHCP GPS operation (block 403). The antenna feed system and receiver/detection circuit are enabled to detect interference conditions using programmed bandwidths and thresholds. When GPS interference is detected (block 405), the control process examines the received signal detected envelope and adjusts the system gain control to asynchronously recognize tailored jamming based on expected denial modulations and characteristics (block 407). Digital signal processing techniques are used in the computer processor as shown in FIG. 8. The procedure includes a user interface 77 for entering the authorization codes for selective availability and time/date update. A local system clock in the microcontroller internally maintains current time/date.

As previously described, the CODEC 65 synchronizes a bit clock to the denial signal rate. Using code and time/date, the procedure develops an encryption key for decoding the detected envelope and via receiver algorithm synchronization develops a predictive message for denial state switching (block 409). If the percent modulation of the detected denial signal is insufficient, the procedure may temporarily modify the default ISU and/or gain control setting of the process to improve detection. After denial synchronization is accomplished, the procedure enables tandem adaptive nulling in each phase of the denial modulation (block 411). The tandem adaptive nulling procedure effectively multiplexes the adaptive phase control loops using predicted keying modulation. Digital signal processing techniques in the microcontroller are used to perform these control functions. The data acquisition process digitizes the received denial signal and stores the measurement tagged by the denial state and time in buffer memory for orderly tandem processing and iterative nulling.

The adaptive control algorithms store the respective phase shifter control setting for each denial phase state in a multiport memory arrangement composed of registers with synchronously multiplexed output to the phase shifters in the ISU using the high speed keying modulation. After denial nulling is accomplished, the procedure examines the switched insertion phase condition that may result from tandem switching and develops an equalization phase modulation using computed values from a programmed phase calibration table (block 413) for GPS signals. The insertion phase modulation is applied during the proper phase of the denial signal using a separate memory/register and the keying waveform. While the interference signal is detected, the procedure continuously detects, decodes, synchronizes and nulls the tandem interference; when interference is not detected, the procedure returns the ISU to the GPS default condition (block 415). if GPS interference is detected and tailored denial jamming is not recognized, a single adaptive nulling procedure is enabled to suppress the interference (block 417). Insertion phase equalization is not needed for this non-switched case.

The present invention is not to be limited to the specific preferred embodiments described above. A number of variations may be employed but still falling within the scope of the invention as set forth in the following claims. For example, although the preferred jamming waveforms P1 and P2 are two waveforms differing by their polarization states, the transmitted jamming waveforms may comprise two separate and distinct waveforms that differ in other respects such as frequency differences. Still further, although the preferred receiver includes an interference or jamming signal suppression unit to suppress the jamming waveforms in a modulated manner in accordance with the encryption scheme, other techniques for jamming signal removal or suppression may be utilized.

We claim:

1. A system for preventing reception and recognition of global positioning satellite (GPS) signals by unauthorized receivers comprising:

a jamming unit including transmitter means for transmitting plural GPS jamming signals over a geographic area, and transmitter encryption means for enabling said transmitter means to transmit said plural GPS jamming signals in accordance with an encrypted sequence;

one or more receiver units, each receiver unit including GPS jamming signal suppression means for receiving GPS jamming signals and GPS signals and for suppressing said GPS jamming signals to enable detection of the GPS signals, suppression encryption means for enabling said jamming signal suppression means to suppress each of said plural GPS jamming signals in accordance with an encrypted sequence identical to the encrypted sequence of said transmitter encryption means, and GPS signal receiving means for receiving the GPS signals detected by said GPS jamming signal suppression means.

2. The system of claim 1 wherein said transmitter means includes a transmitter for generating each of said plural GPS jamming signals, and an antenna for propagating each of said plural GPS jamming signals, and wherein said transmitter encryption means includes transmitter enabling means for enabling said plural GPS jamming signals to be propagated by said antenna.

3. The system of claim 2 where in said transmitter enabling means is connected with said transmitter for enabling said transmitter to sequentially transmit said plural GPS jamming signals.

4. The system of claim 1 wherein said transmitter means includes means for generating a jamming waveform and radiating means for radiating the jamming waveform at at least two different polarization states.

5. The system of claim 4 wherein said radiating means includes polarization control means for shifting said jamming waveform onto at least first and second polarization state output lines, each output line connected to a radiating antenna means for radiating the jamming waveform at said at least two different polarization states.

6. The system of claim 5 wherein said transmitter encryption means includes polarization keying control means for providing polarization control signals to said polarization control means to shift said jamming waveform onto said at least first and second polarization state output lines, said polarization control signals being encrypted whereby said jamming waveform is radiated at at least two different polarization states in accordance with an encrypted sequence.

7. The system of claim 4 wherein said transmitter encryption means enables said radiating means to radiate the jamming waveform at at least two different polarization states in accordance with an encrypted sequence.

8. The system of claim 7 wherein said GPS jamming signal suppression means includes means for separately suppressing each radiated polarized jamming waveform.

9. The system of claim 8 wherein said suppression encryption means includes means for sequentially enabling said jamming signal suppression means to suppress each of the radiated polarized jamming waveforms in accordance with an encrypted sequence identical to the encrypted sequence of said transmitter encryption means.

10. A global positioning satellite (GPS) selective denial system including a jamming unit for propagating jamming waveforms and at least one receiver unit for receiving GPS signals and propagated jamming waveforms and for suppressing the jamming waveforms to enable reception of the GPS signals, wherein said jamming unit comprises a transmit antenna unit for propagating a jamming waveform at two distinct polarization states, and a transmit control switching unit for controlling the sequence of the two propagated polarization states in accordance with an encryption scheme, and wherein said at least one receiver unit includes a receive antenna unit to receive propagated jamming waveforms and GPS signals, a jamming waveform suppression unit for suppressing each polarized state of the received jamming waveforms, and a decode unit for enabling the jamming waveform suppression unit to suppress each polarized state of the received jamming waveforms in accordance with said encryption scheme.

11. The system of claim 10 wherein said jamming unit further comprises a jamming waveform generator and an encryption controlled transmitter for switching the jamming waveform generated by said generator between a pair of transmitter outputs in accordance with said encryption scheme, said transmitter outputs connected with said transmit antenna unit wherein the jamming waveforms at each transmitter output are propagated by said transmit antenna unit at each of the two distinct polarization states.

12. The system of claim 11 wherein said transmit control switching unit is connected with said encryption controlled transmitter for switching the jamming waveform between said pair of transmitter outputs in accordance with said encryption scheme supplied by said transmit control switching unit.

13. The system of claim 12 wherein transmit control switching unit includes a first input for receiving a two-state code pattern and a second input for receiving a clocking signal, wherein said encryption scheme is determined by switching between the two states in accordance with the code pattern at the clocking signal rate.

14. The system of claim 13 wherein said decode unit of said at least one receiver unit includes an input for receiving said two-state code pattern and further includes a decode processor and control unit for detecting the encryption scheme of said propagated jamming waveform and synchronizing the detected encryption scheme with the code pattern to produce a predicted switch control sequence, said predicted switch control sequence applied to said jamming waveform suppression unit to suppress each polarized state of the jamming waveform in accordance with said predicted switch control sequence.

15. The system of claim 14 wherein said receive antenna unit includes means for converting the received jamming waveforms and received GPS signals into orthogonally polarized components.

16. The system of claim 14 wherein said receiver unit further comprises means for minimizing the effects of insertion phase modulation on the GPS signals when said predicted switch control sequence is applied to said jamming waveform suppression unit.

* * * * *